United States Patent [19]

Cage et al.

[11] Patent Number: 4,545,953
[45] Date of Patent: Oct. 8, 1985

[54] METHOD FOR MAKING AN EXTRUSION BLOW MOLDED NO DRIP LIP

[75] Inventors: James K. Cage, Santa Ana; Edgardo I. Villena, Placentia, both of Calif.

[73] Assignee: Hunt-Wesson Foods, Inc., Fullerton, Calif.

[21] Appl. No.: 435,628

[22] Filed: Oct. 20, 1982

[51] Int. Cl.$^4$ .................... B29C 17/07; B29C 17/10
[52] U.S. Cl. .................... 264/533; 264/536; 425/527; 425/531
[58] Field of Search ............ 264/533, 536, 153, 163; 425/525, 527, 531; 215/31; 222/571

[56] References Cited

U.S. PATENT DOCUMENTS

| | | |
|---|---|---|
| 3,209,401 | 10/1965 | Mennert. |
| 3,224,038 | 12/1965 | Budesheim. |
| 3,357,053 | 12/1967 | Lyon et al. |
| 3,531,556 | 9/1970 | Mennert. |
| 3,767,747 | 10/1973 | Uhlig .................... 264/533 X |
| 3,822,161 | 7/1974 | Haase .................... 264/163 X |
| 3,912,438 | 10/1975 | Padovani. |
| 3,917,788 | 11/1975 | Padovani. |
| 3,949,034 | 4/1976 | Uhlig .................... 264/536 X |
| 4,409,178 | 10/1983 | Ward .................... 264/163 X |

FOREIGN PATENT DOCUMENTS

| | | | |
|---|---|---|---|
| 53-144966 | 12/1978 | Japan ............ | 264/533 |
| 557768 | 1/1975 | Switzerland ............ | 222/571 |

Primary Examiner—Jan Silbaugh
Attorney, Agent, or Firm—Pretty, Schroeder Brueggemann & Clark

[57] ABSTRACT

An extrusion blow molded container is provided having an integrally formed generally annular pouring lip including an upwardly facing convex surface beginning at a generally vertical inner wall of the container and curving through an arc of less than 180 degrees. The lip is undercut forming a sharp downwardly directed annular edge on the lip. The lip can be formed by cutting the lip with a downwardly curved cutting tool bearing against an upwardly curved anvil, the cutting tool forming the upwardly facing convex surface of the lip and the anvil forming the undercut lower surface of the lip.

10 Claims, 4 Drawing Figures

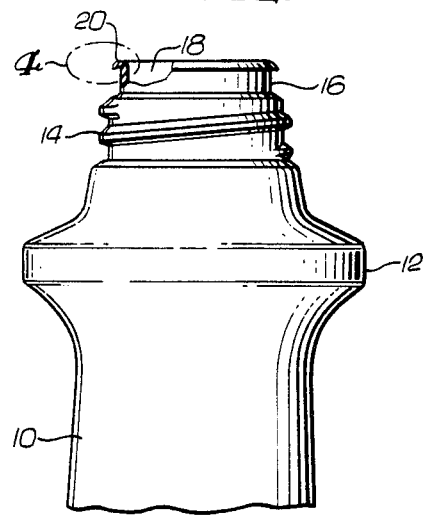
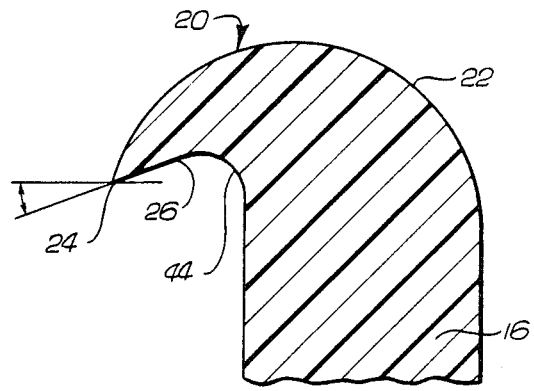
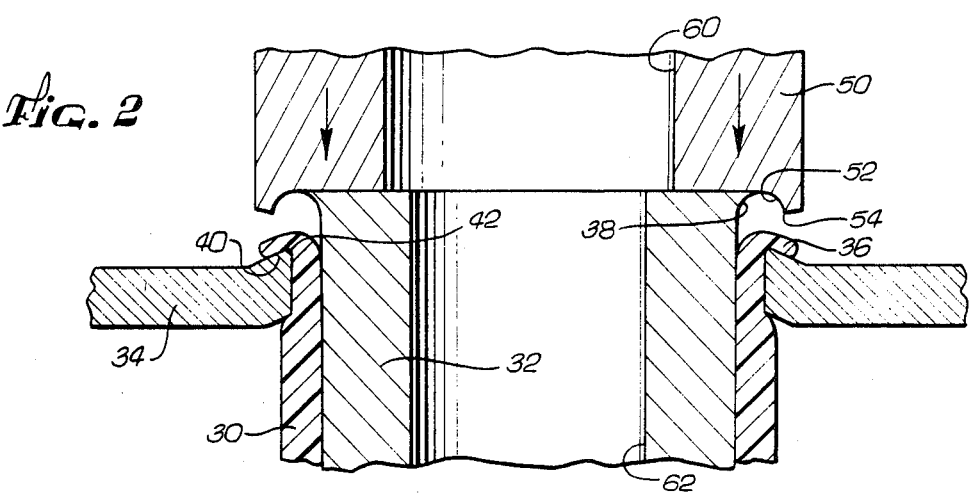
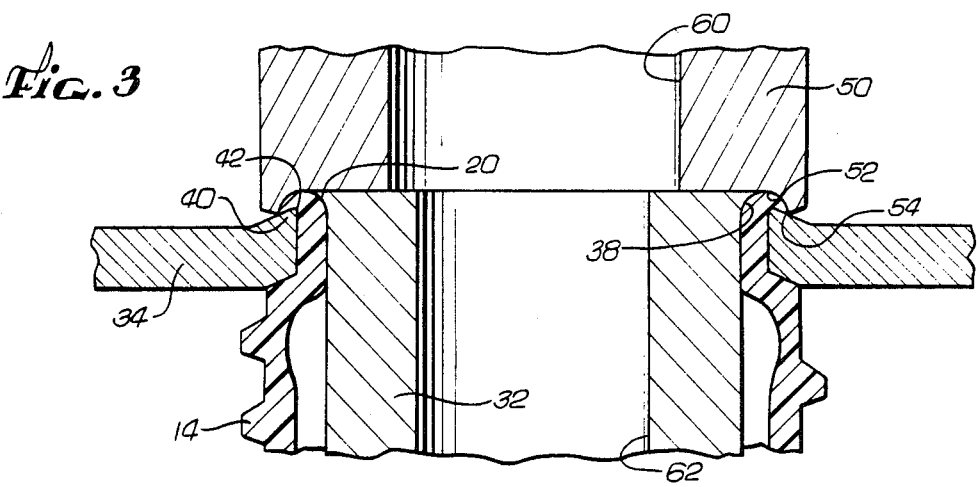

– 4,545,953 –

METHOD FOR MAKING AN EXTRUSION BLOW MOLDED NO DRIP LIP

FIELD OF THE INVENTION

The present invention relates to pouring lips that are used in connection with containers for liquids and, more particularly, to a lip for preventing the liquid contents of the container from dripping and a process for manufacturing such a lip on a container.

BACKGROUND OF THE INVENTION

When a liquid is poured from a container, it is often found that it is difficult to terminate pouring without having one or more drops of the liquid run down the outside of the container. This tendency to drip is largely a characteristic of the container itself, rather than a function of the pouring motion. Thus, it is known by those skilled in the art that dripping can be substantially eliminated by a combination of a properly contoured mouth or lip on the container and a non-wetting pouring surface on the lip. A well designed no-drip container will actually cause the last drops of a liquid to be pulled back into the container even if they have passed the highest point on the pouring surface.

Unfortunately, it has often been impractical to incorporate satisfactory no-drip characteristics in large numbers of mass produced containers. Consumer dissatisfaction with the pour characteristics of inexpensive mass-produced containers, such as salad oil bottles, is aggravated by the fact that the containers are sometimes used over and over again to pour relatively small quantities. The dripped contents tend to accumulate on the outside of the container, leading to a messy and potentially unsanitary condition.

One known solution to the above problem is to form the container by a process which permits a high degree of accuracy in forming the neck of the container. Unfortunately, this process is relatively expensive and significantly increases the cost of producing the containers. Another known solution to the above problem is the use of a fitment, a small permanent attachment to the mouth of the container that forms the pouring surface. There are, however, a number of important problems and disadvantages associated with the use of fitments. The manufacture of a fitment having the desired three dimensional pouring surface is often an expensive proposition requiring a complex molding process. It is also difficult to obtain a good seal between the fitment and the container because of the relatively large tolerances generally associated with such containers, and leakage can occur between the fitment and the cap or closure of the containers.

The objective of the present invention is to provide a no-drip pouring lip on a container manufactured by a relatively inexpensive process, which overcomes the disadvantages of previously known fitments and expensive molding processes, and satisfies the design criteria set forth above.

SUMMARY OF THE INVENTION

The above objective is accomplished by the present invention, according to which a thermoplastic material is extruded to form a parison having an annular neck. The parison is positioned between a blow pin on the inside and an anvil on the outside. A cutting and forming tool is brought into contact with the parison in opposition to the anvil, thereby forming a no-drip lip, the lip being thus shaped such that it has a convex generally arcuate pouring surface and an undercut surface that meets the pouring surface to form a sharp downwardly directed annular edge. The parison is expanded into a mold by the application of internal fluid pressure. Preferably, the pouring surface meets the undercut surface before the tangent of the pouring surface becomes vertical.

The pouring surface, which can begin at an internal vertical wall of the neck, is convex and can be generally arcuate, subtending an angle of less than 180 degrees. 150 to 175 degrees is preferred, particularly 165 degrees.

For best results, the undercut surface, where it meets the pouring surface, forms an angle with the horizontal, preferably about 20 degrees. A preferred thermoplastic material is polyvinyl chloride.

Other features and advantages of the present invention will be apparent from the following detailed description, taken in conjunction with the accompanying drawings, which illustrate, by way of example, the principles of the invention.

BRIEF DESCRIPTION OF THE DRAWINGS

FIG. 1 is a fragmentary, elevational view of an extrusion blow molded bottle embodying the present invention, the bottle being partially broken away to reveal the no-drip pouring lip of the present invention in cross-section;

FIG. 2 is an enlarged, fragmentary elevational view illustrating the process of producing the lip of the present invention, and showing the parison being held by the blow pin and anvil prior to cutting of the lip;

FIG. 3 is an enlarged, fragmentary elevational view similar to the view of FIG. 2, but illustrating the container as having been blown to its finished configuration, and illustrating the lip as having been formed and cut by the cutting tool; and FIG. 4 is a further enlarged, fragmentary view in cross-section of the no-drip pouring lip made in accordance with the present invention.

DESCRIPTION OF THE PREFERRED EMBODIMENT

As illustrated in the exemplary drawings, an extrusion blow molded container 10 formed by the present invention is shown in fragmentary form and includes a laterally projecting flange 12 to facilitate handling the container and a set of threads 14 near the top of the container for receiving a top or closure (not shown). In this instance, the container is illustrated as having about 1½ turns of thread for receiving the closure. Containers of the type illustrated in FIG. 1 are suitable for a myriad of uses, but the particular container illustrated is intended for use with liquid food products, such as cooking oil, salad oil, and the like.

Extending upwardly from the threaded portion of the container 10 is a neck 16 that forms a short tubular extension defining an opening or mouth 18 at the top of the container 10. At the top of the neck 16 is an outwardly extending annular lip 20 that forms a no-drip pouring surface.

In accordance with the present invention, the no-drip pouring lip 20 is formed integrally on an extrusion blow molded container 10 during the finishing step of cutting the top of the container. More specifically, the no-drip pouring lip 20, indicated generally in enlarged FIG. 4, is formed at the top of the neck 16 and includes an upwardly facing convex surface 22 beginning at a tangent to the upper end of the generally vertical inner wall of the neck 16 and curving through an arc of less than 180 degrees, terminating at an outermost point 24 of the lip 20. The lip 20 further includes an undercut surface 26 beginning at the outermost point 24 of the lip and extending upwardly and inwardly therefrom forming a sharp, downwardly directed annular edge on said lip at the outermost point 24.

As mentioned above, the upwardly facing convex surface 22 subtends an arc of less than 180 degrees measured from its tangent to the inner wall of the neck 16 to the outermost point 24 of the lip. That is, the surface 22 is terminated at its outer extremity at a point before a tangent to the downwardly curving portion of the lip reaches vertical. Preferably, the surface 22 defines an arc in the range of 150 degrees to 175 degrees, and more particularly defines an arc of about 165 degrees. As illustrated in exemplary FIG. 4, the undercut surface 26 of the lip defines an acute angle with the horizontal, and this acute angle is preferably about 20 degrees.

In accordance with the process of the present invention, which is best illustrated in FIGS. 2 and 3, the no-drip pouring lip 20 is formed integrally on the extrusion blow molded container 10 by holding an extruded parison 30 between a blow pin 32 on the interior of the parison and an anvil 34 on the exterior of the parison. The parison as so held includes an excess upper extremity or moile 36 which folds outwardly over the top of the anvil 34 as shown in FIG. 2. For forming the inner portion of the convex surface 22 of the lip 20, the upper portion of the blow pin 32 includes an upwardly and outwardly curving surface 38 which terminates at a point generally corresponding to the highest point on the convex surface 22 of the lip.

To form the undercut surface 26 on the lip 20, the anvil 34 is provided with an upwardly projecting lug 40 adjacent the exterior of the parison 30. The lug 40 has an upwardly facing arcuate surface 42 shaped to conform with the desired shape of the undercut surface 26 of the lip. In this instance, the arcuate surface 42 defines the undercut angle described above, in the preferred example about 20 degrees, as well as an appropriate undercut radius 44 (FIG. 4) to provide a smooth transition from the undercut surface to the outer wall of the neck 16.

As can best be seen in FIG. 2, a cutting tool 50 is illustrated immediately above and secured to the blow pin 32. The cutting tool 50 includes a downwardly facing concave surface 52 ending in a sharp cutting edge 54 at its lower end. The concave surface 52 curves outwardly and downwardly with respect to the parison and is shaped to conform to the desired shape of the outer portion of the surface 22 on the lip 20.

When it is desired to cut the upper extremity or moile 36 of the parison off to form the no-drip pouring lip 20, the cutting tool 50 and blow pin 32 are moved downwardly, as indicated by the arrows in FIG. 2, to the position illustrated in FIG. 3. With this arrangement, the edge 54 of the tool 50 contacts the arcuate surface 42 on the anvil 34. The concave surface 52 of the cutting tool cooperates with the curved surface 38 of the blow pin to form the upwardly facing convex surface 22 on the no-drip lip 20.

As described above, the arcuate surface 42 on the anvil forms the undercut surface 26 of the lip 20. Accordingly, when the cutting edge 54 of the cutting tool 50 contacts the arcuate surface 42 on the anvil, the excess material or moile 36 at the top of the parison 30 is severed from the parison, thereby producing the desired sharp, downwardly directed annular edge on the no-drip pouring lip 20.

As is well known in the extrusion blow molding art, the container 10 is formed by placing the parison 30 within a blow mold (not shown), and expanding the parison to conform to the shape of the blow mold by introducing a fluid under pressure, usually air, into the parison. For this purpose, the cutting tool 50 includes a central passage 60 and the blow pin 32 includes a central passage 62 to accommodate the introduction of air into the parison 30 during the blow molding process.

In the example illustrated in FIGS. 2 and 3, the blow mold is located immediately below the anvil 34, and if desired, the anvil can either be attached to the blow mold or formed as an integral part of the blow mold. It will be noted that in the fragmentary view illustrated in FIG. 3, the parison has been expanded to conform to the shape of the blow mold, and the threads 14 appear on the exterior of the container 10.

In the preferred process of the present invention, the parison 30 is held between the blow pin 32 and the anvil 34, the the container 10 is blow molded as the blow pin 32 is inserted into the parison 30, and then the cutting tool 50 cuts and forms the finished no-drip pouring lip 20. Further, although many thermoplastic materials are suitable for use in this process, the presently preferred material is polyvinyl chloride.

From the foregoing, it will be apparent that the present invention provides an extrusion blow molded container 10, and a process for manufacturing the same, which permits a highly desirable no-drip pouring lip 20 to be formed integrally on the container as part of the extrusion blow molding process. This invention thereby overcomes the economic disadvantages presented by manufacturing such containers by injection blow molding or adding injection molded fitments to extrusion blow molded containers, and permits this very popular consumer product to be produced at a greatly reduced expense.

While a particular form of the invention has been illustrated and described, it will be apparent that various modifications can be made without departing from the spirit and scope of the invention.

We claim:

1. A process for making a container with a no-drip lip by extrusion blow molding comprising the steps of:
   extruding thermoplastic material to form a parison having an open end and an adjacent annular neck;
   positioning said annular neck between a blow pin on the inside and an anvil on the outside;
   bringing a cutting and forming tool into contact with said parison at said open end in opposition to said anvil thereby cutting and forming said parison between said cutting and forming tool and said anvil to produce said no-drip lip, said lip being thus shaped such that it has a convex generally arcuate pouring surface and an undercut surface forming an acute angle with the horizontal that extends downwardly toward said pouring surface and meets said pouring surface to form a sharp downwardly directed annular edge; and
   expanding said parison into a mold by the application of internal fluid pressure.

2. The process of claim 1 wherein said lip is thus shaped such that said pouring surface meets said undercut surface before the tangent of said pouring surface becomes vertical.

3. The process of claim 2 wherein said lip is thus shaped such that said undercut surface, at the point where it meets said pouring surface, forms an angle of about 20 degrees with the horizontal.

4. The process of claim 2 wherein said lip is thus shaped such that said arcuate pouring surface begins at a vertical inner wall of said neck and extends through an arc of about 150 to 175 degrees.

5. The process of claim 4 wherein said lip is thus shaped such that said undercut surface, at the point where it meets said pouring surface, forms an angle of about 20 degrees with the horizontal.

6. The process of claim 2 wherein said lip is thus shaped such that said arcuate pouring surface begins at a vertical inner wall of said neck and subtends an arc less than 180 degrees.

7. The process of claim 6 wherein said lip is thus shaped such that said undercut surface, at the point where it meets said pouring surface, forms an angle of about 20 degrees with the horizontal.

8. The process of claim 7 wherein said arc subtends about 165 degrees.

9. The process of claim 8 wherein said thermoplastic material is polyvinyl chloride.

10. The process of claim 1 wherein said thermoplastic material is polyvinyl chloride.

* * * * *